(12) United States Patent
Wright

(10) Patent No.: US 8,529,846 B1
(45) Date of Patent: Sep. 10, 2013

(54) COMPOSITE HEALTH MONITORING/DAMAGE MITIGATION USING MULTI-COMPONENT MICROCAPSULES

(75) Inventor: Michael E. Wright, Ridgecrest, CA (US)

(73) Assignee: The United States of America as Represented by the Department of Navy, Washington, DC (US)

( * ) Notice: Subject to any disclaimer, the term of this patent is extended or adjusted under 35 U.S.C. 154(b) by 16 days.

(21) Appl. No.: 13/282,360

(22) Filed: Oct. 26, 2011

(51) Int. Cl.
*G01L 5/00* (2006.01)

(52) U.S. Cl.
USPC .......... 422/400; 422/401; 436/5; 436/56; 73/12.01; 73/82; 116/200; 116/203

(58) Field of Classification Search
USPC .......... 422/400, 401; 436/5, 56; 73/12.01, 73/82; 116/200, 203
See application file for complete search history.

(56) References Cited

U.S. PATENT DOCUMENTS

| 4,837,061 A | 6/1989 | Smits et al. |
| 5,242,830 A * | 9/1993 | Argy et al. ............... 436/5 |
| 5,474,805 A | 12/1995 | Vaughn |
| 6,047,964 A | 4/2000 | Lawandy et al. |
| 6,059,500 A | 5/2000 | Dirmeier et al. |
| 2004/0115818 A1* | 6/2004 | Puri et al. ............... 436/3 |

OTHER PUBLICATIONS

Yan Chao Yuan, et "Self-Healing Polymeric Materials Using Epoxy/Mercaptan as the Healant" Macromolecules, 2008, 41 (14), pp. 5197-5202.

* cited by examiner

*Primary Examiner* — Lyle Alexander
(74) *Attorney, Agent, or Firm* — Charlene A. Haley

(57) ABSTRACT

A system, method and apparatus in the detection of a scent to locate the damage and its extent and to aid in the repair manually or self-repair.

20 Claims, 1 Drawing Sheet

*Sensor targeted molecules released-alert given* damage event

Repair chemicals released to mitigate damage & retain composite strength

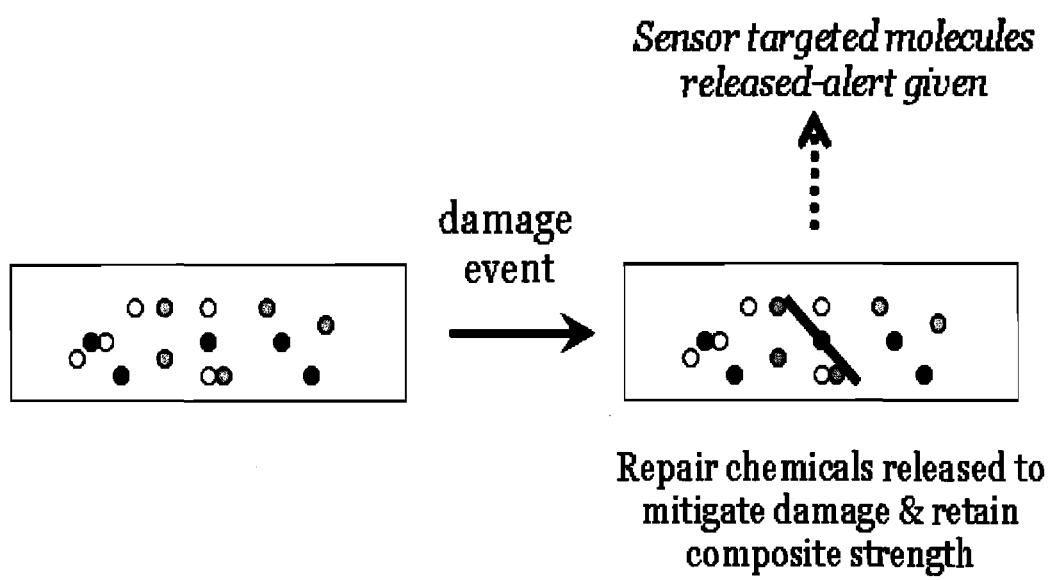

COMPOSITE HEALTH MONITORING/DAMAGE MITIGATION USING MULTI-COMPONENT MICROCAPSULES

STATEMENT REGARDING FEDERALLY SPONSORED RESEARCH OR DEVELOPMENT

The invention described herein may be manufactured and used by or for the government of the United States of America for governmental purposes without the payment of any royalties thereon or therefor.

FIELD OF THE INVENTION

The invention generally relates to detection concurrent with repair of a damaged device, and more specifically, detection of a scent to locate the damage, extent of damage, and to contribute to the repair manually and/or spontaneously initiate self-repair.

BRIEF DESCRIPTION OF THE DRAWINGS

FIG. 1 is a diagram showing an airborne chemical sensor detecting signature molecules upon damage-self repair initiated concomitant with signal release, according to embodiments of the invention.

It is to be understood that the foregoing general description and the following detailed description are exemplary and explanatory only and are not to be viewed as being restrictive of the invention, as claimed. Further advantages of this invention will be apparent after a review of the following detailed description of the disclosed embodiments, which are illustrated schematically in the accompanying drawings and in the appended claims.

DETAILED DESCRIPTION OF THE EMBODIMENTS OF THE INVENTION

Embodiments of the invention generally relate to a system, method and apparatus in the detection of a scent to locate the damage and its extent and to aid in the repair manually or self-repair.

Detecting composite damage, particularly so in the field is very difficult, yet a critical requirement for ensuring weapon/warfighter performance, safety, and the ability to complete a mission. Embodiments of the invention present a rapid and simple solution for first identifying composite damage which has occurred and also to provide a degree of composite repair in response to the damage.

Detecting composite repair and health monitoring is critical and a challenging problem. In embodiments of this invention, airborne triggers are used to permit both user and/or instrument detection of composite panels that can be accomplished quickly, instantly, and using simple sensor equipment (including a person's nose).

Current methods for detecting composite damage rely upon often large and cumbersome equipment and can take hours just to measure a small area. Many applications can be all but impossible for an actual part in use (e.g. a helicopter blade). Current methods such as ultrasound and C-scan have extremely limited use and value in the field. They are time consuming, costly, and virtually impossible to apply to complicated 3-dimensional shapes, which so often fits the description of a composite part.

A rapid and accurate means of knowing when composite damage has occurred would be extremely valuable, and being able to invoke repair concurrently, could be priceless. Embodiments of the invention provide a process for a rapid alert of composite damage and by being a multi-functional material, will provide instantaneous mitigation of the damage. Embodiments of the invention will not require costly sensors, or elaborate modification of the composite part, or drastic changes in manufacturing processes, thus allowing for ease of recertification (or perhaps no recertification period).

The concept of microencapsulation has been used extensively in several industries. Most relevant would be the scratch & sniff patches used in books and many other applications (e.g. U.S. Pat. No. 5,474,805). Upon damage (i.e. scratch of the paint/coating) a scent is released that had been sequestered by microencapsulation. To the best of our knowledge, this technology has not been used in composite resins. Furthermore, it has not been used as a means damage assessment.

Systems for damage induced repair have been employed using liquid epoxy resins microencapsulated in a polymeric shell (White et al. 2001; Kessler et al. 2003; Brown et al. 2004). They work on the basis that damage ruptures the shells and then releases a curable resin into the path of a propagating crack. The hardener and/or curing catalyst can be dispersed throughout the matrix or it can be contained in a second microcapsule that also ruptures. By utilizing a coded variety of targeted airborne molecules in the current invention, location of the damage can be verified/calculated. Furthermore by using a series of molecules of various vapor pressures in the repair capsule, timing of the damage can be calculated based on what molecules remain at the damage site.

An aspect of embodiments of the invention relates to airborne detection systems for composite parts including, at least one first microcapsule having at least one scent composition detectable by a machine, human, and/or animal or any combination thereof, where the scent(s) is associated with a device, and releasing of the scent(s) when damage has occurred to the device to alert a detector of the damage and level of the damage.

Another aspect of embodiments of the invention relates to airborne detection apparatuses including, at least one first microcapsule having at least one scent composition detectable by a machine, human, and/or animal or any combination thereof, where the scent(s) is associated with a device, and where the scent(s) is released when damage has occurred to device to alert a detector of the damage and level of the damage.

Yet another aspect of embodiments of the invention relates to methods for detecting damage in a device including, providing at least one first microcapsule having at least one scent composition detectable by a machine, human, and/or animal or any combination thereof, associating the scent(s) is a device, releasing the scent(s) when damage has occurred to the device, and detecting the scent(s) to alert a detector of said damage and level of the damage.

In embodiments of the invention, the first microcapsule having the scent(s) releases a specific scent formulated to indicate where the damage occurred and/or the level of damage. Other embodiments, the first microcapsule has a scent(s) that releases a specific scent formulated to indicate when the damage occurred. In embodiments, the device is made of materials capable of incorporating the scent at many levels within the device, the levels are selected from the group consisting of surfaces, various depth levels, complete damage through entire device, and any combination thereof.

In embodiments, the specific scents indicate the level of damage in the form of an alert(s) depending on location of damage within the device. Embodiments further include at least one second microcapsule having at least one composite resin associated with the scent(s) and formulated to aid in repair of the damaged device. In embodiments, the scent(s) are combined with the composites within the same microcapsule within, onto, and/or on the device. In embodiments, the first microcapsule has the scent(s) substantially within proximity of the second microcapsules having resin composites within, onto, and/or on the device. In other embodiments, the scents are in the form of nanospheres. In yet other embodiments, the resin composite is immediately activated upon damage of the device to repair the damage. In other embodiments, the release of the scent aides in the detection of the damage to alert user to manually repair the damage.

Embodiments may include formulating the scent(s) to release a specific scent to be detected by a user/machine indicating where the damage occurred and/or the level of damage. Other embodiments include formulating the scent(s) to be detected by user/machine indicating when the damage occurred. Yet other embodiments include formulating the scents to indicate the level of damage in the form of an alert(s) depending on location of damage within the device. Still yet other embodiments include combining the scent(s) with the composites together within a same microcapsule within, onto, and/or on the device.

Embodiments may include positioning the first microcapsule having the scent(s) within substantially proximity of the second microcapsules having resin composites within, onto, and/or on the device. Embodiments may include activating the resin composite(s) immediately upon damage of the device to repair the damage. Embodiments may include releasing the scent(s) aides in the detection of the damage to alert user to manually repair the damage.

Creation of Microcapsules

Embodiments of the invention include microcapsules ranging from 1 to 100 microns. They are created to include reactive chemicals (cure agents) and a selected volatile molecule(s). In embodiments, the reactive chemicals can be epoxy components (resin & hardener), resins that have air- and host resin-initiated cures, and repair resins that cure by interaction with catalyst dispersed in the bulk composite resin.

Selection of Scent Chemicals (SC)

Embodiments of the invention include scent chemicals (SC), like naphthalene, which can be sealed within a hard polymeric shell, the latter is typically a polyurethane or other robust and highly cross-linked polymeric material. The process can be done concurrently with one of the repair microcapsules or SCs can be stored independently in their own microcapsule. A mixture of SC with varying volatilities can be selected in order to tailor the duration of SC emission. In addition, this provides a time-line of when the damage occurred based on what chemicals are still being emitted since the evaporation rate is dependent on the respective vapor pressure of each SC.

Composite Part Manufacture

Composite parts are manufactured using a combination of microencapsulated repair and selected microencapsulated SC components. Typically, no change in processing is required since toughening agents, often delivered as microspheres, are routinely used in composite fabrication processes. For injection molding applications the microcapsules will be dispersed in the carbon or fiberglass cloth. An adhesive that matches the resin in use can be used to insure the microcapsules stay evenly dispersed during processing.

Experimental

General Procedure A. Microencapsules are prepared by emulsion polymerization that have a loading of limonene, naphthalene, and anthracene with relative concentrations of 33:33:34 and 100 parts of epon 828 resin. In a similar manner, microencapsules are prepared that contain RF-24 (an epoxy hardener). The set of microcapsules are mixed with any standard epoxy resin system and processed according to manufacturer's instructions. Typical loadings of microencapsules are 5 to 10 wt-% of the resin used to prepare the panel.

General Procedure B. Microencapsules are prepared by emulsion polymerization that have a loading of limonene, naphthalene, and anthracene with relative concentrations of 33:33:34 and 100 parts of epon 828 resin. The fabric (glass or carbon) is sprayed lightly with a epoxy adhesive and then treated with a equal mixture of SC-capsules and hardener-capsules. The loading should be estimated to be 5 wt-% of the total resin to be used in fabricating the part. The epoxy adhesive should not be allowed to fully cure before the fabrication starts. This helps insure dispersion of the microcapsules during processing of the composite part.

Monitoring of Composite Health/Self-repair

Sensors can be used to detect airborne SC once damage occurs. These sensors do not have to be incorporated in the composite part but just merely be within proximity of the composite part. This saves time & expense of fabricating parts with internal sensors. SC's are selected in a manner they are easily detected and not confused with background/environmental organics. Several handheld or microchip detectors can be used to detect selected organic molecules. In addition, a simple physical inspection by human and/or animal could rapidly detect the SC. Self repair is solely controlled and initiated as a direct response to damage, no user input is needed. The materials are smart materials and self-repairing.

Selected airborne target molecules and repair resin will be encapsulated in nanospheres. The latter will be incorporated in a composite structure and upon damage, the nanosphere contents will be released to: 1) signal damage and 2) initiate self-repair.

Currently, some resin-self-repair strategies can be found using microencapsulation technologies (Yuan et al. 2008 and references therein). Damage detection has been addressed by visual dyes, embedded optical probes/piezoelectrics, ultrasound, or other scanning techniques. This new approach permits development of a highly sensitive yet remote means of detecting composite damage & health.

The detection of composite damage in large and complex structures is a difficult and very costly exercise, if not nearly impossible. A new method for the rapid and accurate detection of composite damage in large complex structures using airborne chemical signals. In addition to emitting a signal (corresponding to damage) embodiments of the invention will initiate self-repair in order to retain maximum composite performance.

Deliver a low cost method for monitoring composite structure health and providing real time damage repair/mitigation insures safety and vehicle performance by accurately detecting significant composite damage.

Where a range of values is provided, it is understood that each intervening value, to the tenth of the unit of the lower limit unless the context clearly dictates otherwise, between the upper and lower limits of that range is also specifically disclosed. Each smaller range between any stated value or intervening value in a stated range and any other stated or intervening value in that stated range is encompassed within the invention. The upper and lower limits of these smaller ranges may independently be included or excluded in the range, and each range where either, neither or both limits are included in the smaller ranges is also encompassed within the invention, subject to any specifically excluded limit in the stated range. Where the stated range includes one or both of the limits, ranges excluding either or both of those included limits are also included in the invention.

While the invention has been described, disclosed, illustrated and shown in various terms of certain embodiments or modifications which it has presumed in practice, the scope of the invention is not intended to be, nor should it be deemed to be, limited thereby and such other modifications or embodiments as may be suggested by the teachings herein are particularly reserved especially as they fall within the breadth and scope of the claims here appended.

What is claimed is:

1. An airborne detection system, comprising:
   at least one first microcapsule having at least one scent composition detectable by a machine, human, and/or animal or any combination thereof;
   wherein said scent(s) is associated with composite part(s);
   releasing of said scent(s) when damage has occurred to said composite part(s) to alert a detector of said damage and level of said damage; and
   at least one second microcapsule having at least one composite epoxy resin associated with said scent(s) and formulated to aid in repair of said damages composite part(s).

2. The system according to claim 1, wherein said first microcapsule having said scent(s) releases a specific scent formulated to indicate wherein said damage occurred and/or said level of damage.

3. The system according to claim 2, wherein said first microcapsule having said scent(s) releases a specific scent formulated to indicate when said damage occurred.

4. The system according to claim 2, wherein said composite part(s) is made of materials capable of incorporating said scent at many levels within said composite part(s), said levels are selected from the group consisting of surfaces, various depth levels, complete damage through entire said composite part(s), and any combination thereof.

5. The system according to claim 2, wherein said specific scents indicate said level of damage in the form of an alert(s) depending on location of damage within said composite part(s).

6. The system according to claim 1, wherein said scent(s) are combined with said composites within the same microcapsule within, onto, and/or on said composite part(s).

7. The system according to claim 1, wherein said first microcapsule having said scent(s) are substantially within proximity of said second microcapsules having resin composites within, onto, and/or on said composite part(s).

8. The system according to claim 1, wherein said scents are in the form of nanospheres.

9. The system according to claim 1, wherein said resin composite is immediately activated upon damage of said composite part(s) to repair said damage.

10. The system according to claim 1, wherein said release of said scent aides in the detection of said damage to alert user to manually repair said damage.

11. An airborne detection apparatus, comprising:
    at least one first microcapsule having at least one scent composition detectable by a machine, human, and/or animal or any combination thereof;
    wherein said scent(s) is associated with composite part(s); and
    at least one second microcapsule having at least one composite epoxy resin associated with said scent(s) and formulated to aid in repair of said damaged composite part(s).

12. The apparatus according to claim 11, wherein said first microcapsule having said scent(s) is formulated to release a specific scent to indicate wherein said damage occurred and/or said level of damage.

13. The apparatus according to claim 12, wherein said first microcapsule having said scent(s) is formulated to release a specific scent to indicate when said damage occurred.

14. The apparatus according to claim 12, wherein said composite part(s) is made of materials capable of incorporating said scent at many levels within said composite part(s), said levels are selected from the group consisting of surfaces, various depth levels, complete damage through entire said composite part(s), and any combination thereof.

15. The apparatus according to claim 12, wherein said specific scents indicate said level of damage in the form of an alert(s) depending on location of damage within said composite part(s).

16. The apparatus according to claim 11, wherein said scent(s) are combined with said composites within the same microcapsule within, onto, and/or on said composite part(s).

17. The apparatus according to claim 11, wherein said first microcapsule having said scent(s) are substantially within proximity of said second microcapsules having resin composites within, onto, and/or on said composite part(s).

18. The apparatus according to claim 11, wherein said scents are in the form of nanospheres.

19. The apparatus according to claim 11, wherein said resin composite is immediately activated upon damage of said composite part(s) to repair said damage.

20. The apparatus according to claim 11, wherein said release of said scent aides in the detection of said damage to alert user to manually repair said damage.

* * * * *